(12) United States Patent
Akazawa et al.

(10) Patent No.: US 9,154,661 B2
(45) Date of Patent: Oct. 6, 2015

(54) IMAGE PROCESSING APPARATUS, IMAGE PROCESSING SETTING METHOD AND STORAGE MEDIUM FOR CHANGING A DEFAULT VALUE BASED ON A FREQUENCY WITH WHICH A SETTING VALUE HAS BEEN CHANGED BY A USER

(75) Inventors: Minoru Akazawa, Kawasaki (JP); Hideaki Nemoto, Sagamihara (JP); Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 13/568,794

(22) Filed: Aug. 7, 2012

(65) Prior Publication Data

US 2013/0050773 A1    Feb. 28, 2013

(30) Foreign Application Priority Data

Aug. 25, 2011  (JP) ................................. 2011-184064

(51) Int. Cl.
*G06F 3/12*     (2006.01)
*H04N 1/00*    (2006.01)

(52) U.S. Cl.
CPC ................................. *H04N 1/00957* (2013.01)

(58) Field of Classification Search
USPC .................... 358/1.9, 2.1, 515, 518
See application file for complete search history.

(56) References Cited

U.S. PATENT DOCUMENTS

| 7,849,231 | B2 | 12/2010 | Niikura |
| 7,889,379 | B2 | 2/2011 | Okayama et al. |
| 7,991,317 | B2 | 8/2011 | Kato et al. |
| 2003/0011801 | A1* | 1/2003 | Simpson et al. ............. 358/1.13 |
| 2003/0184803 | A1* | 10/2003 | Yamada et al. ............. 358/1.16 |
| 2004/0036923 | A1* | 2/2004 | Kokemohr et al. .......... 358/3.27 |
| 2008/0055624 | A1* | 3/2008 | Inui et al. ..................... 358/1.13 |
| 2008/0294983 | A1* | 11/2008 | Hoshino et al. ............... 715/273 |
| 2010/0265547 | A1* | 10/2010 | Katou et al. ................. 358/1.16 |
| 2010/0290071 | A1* | 11/2010 | Okada et al. ................. 358/1.13 |
| 2011/0199623 | A1 | 8/2011 | Okuyama |

FOREIGN PATENT DOCUMENTS

| JP | 09-104151 A | 4/1997 |
| JP | 2004-287860 A | 10/2004 |
| JP | 2008-210383 A | 9/2008 |

* cited by examiner

*Primary Examiner* — Barbara Reinier
(74) *Attorney, Agent, or Firm* — Fitzpatrick, Cella, Harper & Scinto

(57) ABSTRACT

An image processing apparatus acquires user information and changes a default setting value for at least one of a plurality of processes that are defined in a process definition file. The changed default setting value is displayed on a setting screen. The image processing apparatus changes the default setting value based on the frequency with which a setting value has been changed by a user that corresponds to the user information in processing in accordance with the process definition file.

13 Claims, 21 Drawing Sheets

F I G. 5

410
501 — [USER ID]: ******
502 — [PROCESS DEFINITION FILENAME]: IN-HOUSE PUBLICATION TRANSMISSION

504 ⎫ ■DEFINITION ITEM 1: COLOR/MONOCHROME
505 ⎬ ・DEFAULT SETTING VALUE: BLACK AND WHITE
506 ⎭ ・SELECTION PERMISSION: PERMIT
・OPTIONS: FULL COLOR, AUTO (COLOR/BLACK AND WHITE), AUTO (COLOR/GRAYSCALE), GRAYSCALE

■DEFINITION ITEM 2: RESOLUTION
・DEFAULT SETTING VALUE: 200×200dpi
・SELECTION PERMISSION: PROHIBIT
・OPTIONS: 100×100, 150×150, 300×300, 400×400, 600×600

■DEFINITION ITEM 3: PAPER SIZE
・DEFAULT SETTING VALUE: A4
・SELECTION PERMISSION: PROHIBIT
・OPTIONS: A3, A4R, B5

■DEFINITION ITEM 4: FORMAT
・DEFAULT SETTING VALUE: PDF
・SELECTION PERMISSION: PROHIBIT
・OPTIONS: JPEG, TIFF, PDF+OCR, HIGH COMPRESSION PDF

■DEFINITION ITEM 5: TRANSMISSION SETTINGS
・DEFAULT SETTING VALUE: TRANSMIT IN-HOUSE
・SELECTION PERMISSION: PROHIBIT
・OPTIONS: TRANSMIT TO SELF, TRANSMIT TO OUTSIDE, SAVE IN HDD, TRANSMIT TO SMB SERVER

| FILE READING/TRANSMISSION SETTINGS | |
|---|---|
| SETTING ITEM | SETTING VALUE |
| COLOR/MONOCHROME | BLACK AND WHITE ▼ |
| | FULL COLOR |
| RESOLUTION | AUTO (COLOR/BLACK AND WHITE) |
| | AUTO (COLOR/GRAYSCALE) |
| PAPER SIZE | GRAYSCALE |
| FORMAT | PDF |
| TRANSMISSION | TRANSMIT IN-HOUSE |
| | BACK    OK |

701 brackets the dropdown options (FULL COLOR, AUTO (COLOR/BLACK AND WHITE), AUTO (COLOR/GRAYSCALE), GRAYSCALE)

801 — [USER ID] : *******
802 — [PROCESS DEFINITION FILENAME] : IN-HOUSE PUBLICATION TRANSMISSION
803 — [DEFINITION ITEM NUMBER] : 5

805 [DEFINITION ITEM 1 NAME]: COLOR/MONOCHROME
[DEFINITION ITEM 1 EXECUTION FREQUENCY]
 FULL COLOR : 0
 AUTO (COLOR/BLACK AND WHITE) : 0
 AUTO (COLOR/GRAYSCALE) : 0
 GRAYSCALE : 0
 BLACK AND WHITE : 0

[DEFINITION ITEM 2 NAME]: RESOLUTION
[DEFINITION ITEM 2 EXECUTION FREQUENCY]
 100 x 100 : 0
 150 x 150 : 0
 200 x 200 : 0
 300 x 300 : 0
 400 x 400 : 0
 600 x 600 : 0

804

[DEFINITION ITEM 3 NAME]: PAPER SIZE
[DEFINITION ITEM 3 EXECUTION FREQUENCY]
 A4 : 0
 A3 : 0
 A4R : 0
 B5 : 0

[DEFINITION ITEM 4 NAME]: FORMAT
[DEFINITION ITEM 4 EXECUTION FREQUENCY]
 TIFF : 0
 JPEG : 0
 PDF : 0
 PDF + OCR : 0
 HIGH COMPRESSION PDF : 0

[DEFINITION ITEM 5 NAME]: TRANSMISSION SETTINGS
[DEFINITION ITEM 5 EXECUTION FREQUENCY]
 TRANSMIT TO SELF : 0
 TRANSMIT IN-HOUSE : 0
 TRANSMIT TO OUTSIDE : 0
 SAVE IN HDD : 0
 TRANSMIT TO SMB SERVER : 0

FIG. 9

```
                                                                    900
┌─────────────────────────────────────────────────────────────────────┐
│   [USER ID] : *******                                               │
│   [PROCESS DEFINITION FILENAME] : IN-HOUSE PUBLICATION TRANSMISSION │
│   [DEFINITION ITEM NUMBER] : 5                                      │
│                                                                     │
│   [DEFINITION ITEM 1 NAME]: COLOR/MONOCHROME                        │
│   [DEFINITION ITEM 1 EXECUTION FREQUENCY]                           │
│    FULL COLOR : 0                                                   │
│    AUTO (COLOR/BLACK AND WHITE) : 16                                │
│    AUTO (COLOR/GRAYSCALE) : 0                                       │
│    GRAYSCALE : 0                                                    │
│    BLACK AND WHITE : 2                                              │
│                                                                     │
│   [DEFINITION ITEM 2 NAME]: RESOLUTION                              │
│   [DEFINITION ITEM 2 EXECUTION FREQUENCY]                           │
│    100 x 100 : 0                                                    │
│    150 x 150 : 0                                                    │
│    200 x 200 : 18                                                   │
│    300 x 300 : 0                                                    │
│    400 x 400 : 0                                                    │
│    600 x 600 : 0                                                    │
│                                                                     │
│   [DEFINITION ITEM 3 NAME]: PAPER SIZE                              │
│   [DEFINITION ITEM 3 EXECUTION FREQUENCY]                           │
│    A4 : 18                                                          │
│    A3 : 0                                                           │
│    A4R : 0                                                          │
│    B5 : 0                                                           │
│                                                                     │
│   [DEFINITION ITEM 4 NAME]: FORMAT                                  │
│   [DEFINITION ITEM 4 EXECUTION FREQUENCY]                           │
│    TIFF : 0                                                         │
│    JPEG : 0                                                         │
│    PDF : 18                                                         │
│    PDF + OCR : 0                                                    │
│    HIGH COMPRESSION PDF : 0                                         │
│                                                                     │
│   [DEFINITION ITEM 5 NAME]: TRANSMISSION SETTINGS                   │
│   [DEFINITION ITEM 5 EXECUTION FREQUENCY]                           │
│    TRANSMIT TO SELF : 0                                             │
│    TRANSMIT IN-HOUSE : 18                                           │
│    TRANSMIT TO OUTSIDE : 0                                          │
│    SAVE IN HDD : 0                                                  │
│    TRANSMIT TO SMB SERVER : 0                                       │
└─────────────────────────────────────────────────────────────────────┘
```

Labels: 805, 901, 902, 804

F I G. 10

| FILE READING/TRANSMISSION SETTINGS | | 1000 |
|---|---|---|
| SETTING ITEM | SETTING VALUE | |
| COLOR/MONOCHROME | AUTO (COLOR/BLACK AND WHITE) ▼ | |
| RESOLUTION | 200×200dpi | |
| PAPER SIZE | A4 | |
| FORMAT | PDF | |
| TRANSMISSION | TRANSMIT IN-HOUSE | |
| | BACK | OK |

FIG. 17

| FILE READING/TRANSMISSION SETTINGS | |
|---|---|
| COLOR/MONOCHROME | GRAYSCALE ▼ |
| | FULL COLOR |
| RESOLUTION | AUTO (COLOR/BLACK AND WHITE) |
| | AUTO (COLOR/GRAYSCALE) |
| PAPER SIZE | GRAYSCALE |
| FORMAT | PDF |
| TRANSMISSION | TRANSMIT IN-HOUSE |

1701

BACK | SAVE | SAVE/TRANSMIT | TRANSMISSION

FIG. 18

| FILE READING/TRANSMISSION SETTINGS | |
|---|---|
| COLOR/MONOCHROME | AUTO (COLOR/BLACK AND WHITE) ▼ |
| RESOLUTION | 200×200dpi |
| PAPER SIZE | A4 |
| FORMAT | PDF |
| TRANSMISSION | TRANSMIT IN-HOUSE |

BACK | SAVE (1801) | SAVE/TRANSMIT (1802) | TRANSMISSION (1803)

F I G. 20

2001 — [USER ID]: ******
[PROCESS DEFINITION FILENAME]: IN-HOUSE PUBLICATION TRANSMISSION (COLOR)

2002 — ■ DEFINITION ITEM 1: COLOR/MONOCHROME
• DEFAULT SETTING VALUE: AUTO (COLOR/BLACK AND WHITE)
• SELECTION PERMISSION: PROHIBIT
• OPTIONS: FULL COLOR, AUTO (COLOR/BLACK AND WHITE), AUTO (COLOR/GRAYSCALE), GRAYSCALE

■ DEFINITION ITEM 2: RESOLUTION
• DEFAULT SETTING VALUE: 200×200dpi
• SELECTION PERMISSION: PROHIBIT
• OPTIONS: 100×100, 150×150, 300×300, 400×400, 600×600

■ DEFINITION ITEM 3: PAPER SIZE
• DEFAULT SETTING VALUE: A4
• SELECTION PERMISSION: PROHIBIT
• OPTIONS: A3, A4R, B5

■ DEFINITION ITEM 4: FORMAT
• DEFAULT SETTING VALUE: PDF
• SELECTION PERMISSION: PROHIBIT
• OPTIONS: JREG, TIFF, PDF+OCR, HIGH COMPRESSION PDF

■ DEFINITION ITEM 5: TRANSMISSION SETTINGS
• DEFAULT SETTING VALUE: TRANSMIT IN-HOUSE
• SELECTION PERMISSION: PROHIBIT
• OPTIONS: TRANSMIT TO SELF, TRANSMIT TO OUTSIDE, SAVE IN HDD, TRANSMIT TO SMB SERVER

IMAGE PROCESSING APPARATUS, IMAGE PROCESSING SETTING METHOD AND STORAGE MEDIUM FOR CHANGING A DEFAULT VALUE BASED ON A FREQUENCY WITH WHICH A SETTING VALUE HAS BEEN CHANGED BY A USER

BACKGROUND OF THE INVENTION

1. Field of the Invention

The present invention relates to an image processing apparatus that performs setting of image processing, an image processing setting method for the image processing apparatus, and a storage medium that stores a program.

2. Description of the Related Art

In recent years, image processing apparatuses have been known that read an image on an original and generate image data by a reading function, and that transmit the generated data to destinations by a transmission function. In these cases, a user designates a reading parameter used when the image on the original is read, and also designates a transmission protocol, a transmission destination and the like used when the generated image data is transmitted. In the case where a series of processes is executed by combining a plurality of functions as above (for example, reading function and transmission function), a wide range of contents needs to be designated by the user, and thus operations are troublesome.

In Japanese Patent Laid-Open No. 09-104151, a configuration is described in which in the case where a user selects a plurality of functions, a selection frequency of each function is stored every time the user performs a selection operation, and in which if the selection frequency of a function exceeds a predetermined threshold, that function is displayed preferentially on an operation unit. It is described that, as a result, in the case where the operation unit can only perform one line function display and menu items of the functions are further in hierarchical structure, it is possible to preferentially display a setting function that the user often uses through less operations, and thus it is possible to reduce user operations.

Moreover, Japanese Patent Laid-Open No. 2004-287860 describes a system in which in the case of executing multiple services in coordination with each other, an instruction sheet that defines the content of multiple processes that are to be executed is created in advance and stored in a server that is network-connected to an image processing apparatus. The image processing apparatus obtains the instruction sheet from the server, and processes a document in accordance with definitions described in the instruction sheet. According to Japanese Patent Laid-Open No. 2004-287860, a configuration is described in which a user only needs to instruct the execution of the instruction sheet that has been prepared in advance in order for processes of the content described in the instruction sheet to be executed in order, thus enabling reducing user operations.

Here, it is assumed that the above-mentioned instruction sheet is changeable by the user to a certain extent. This is due to the fact that in an environment where multiple users use an image processing apparatus, it is conceivable that one instruction sheet is shared with multiple users, although it would be expected that different settings are needed for each user in order to satisfy the usage levels of all users. For example, even if an instruction sheet defines that monochrome processing is performed on an image read from an original, it is conceivable that there are users who desire to transmit an image that has undergone color processing. In other words, users who desire such color processing need to change the monochrome processing setting to color processing every time, and thus the above-mentioned system requires much time and effort.

SUMMARY OF THE INVENTION

An aspect of the present invention is to eliminate the above-mentioned problems with the conventional technology. The present invention provides an image processing apparatus that improves setting processing efficiency of image processing by a user, an image processing setting method for the image processing apparatus, and a storage medium that stores programs.

The present invention in its first aspect provides an image processing apparatus that executes processing in accordance with a process definition file in which a plurality of processes that are to be executed are defined, comprising: an acquisition unit configured to acquire user information; a changing unit configured to change a default setting value for at least one of the plurality of processes that are defined in the process definition file, according to the user information acquired by the acquisition unit; and a display control unit configured to display the default setting value changed by the changing unit on a setting screen, wherein the changing unit changes the default setting value based on a frequency with which a setting value has been changed by a user that corresponds to the user information in processing in accordance with the process definition file.

The present invention in its second aspect provides an image processing setting method that is executed in an image processing apparatus that executes processing in accordance with a process definition file in which a plurality of processes that are to be executed are defined, the image processing setting method comprising: an acquisition step of acquiring a user information; a changing step of changing a default setting value for at least one of the plurality of processes that are defined in the process definition file, according to the user information acquired in the acquisition step; and a display control step of displaying the default setting value changed in the changing step on a setting screen, wherein, in the changing step, the default setting value is changed based on a frequency with which a setting value has been changed by a user that corresponds to the user information in processing in accordance with the process definition file.

The present invention in its third aspect provides a computer-readable storage medium configured to store a program that causes a computer to execute: an acquisition step of acquiring a user information; a changing step of changing a default setting value for at least one of the plurality of processes that are defined in the process definition file, according to the user information acquired in the acquisition step; and a display control step of displaying the default setting value changed in the changing step on a setting screen, wherein, in the changing step, the default setting value is changed based on a frequency with which a setting value has been changed by a user that corresponds to the user information in processing in accordance with the process definition file.

According to the present invention, the setting processing efficiency of image processing by a user can be improved.

Further features of the present invention will become apparent from the following description of exemplary embodiments with reference to the attached drawings.

BRIEF DESCRIPTION OF THE DRAWINGS

FIG. 5 is a diagram showing content of a process definition file.

FIG. 7 is a diagram showing a screen that is displayed at the time of making a selection using a cursor.

FIG. 8 is a diagram showing a process definition file execution history.

FIG. 9 is another diagram showing a process definition file execution history.

FIG. 10 is a diagram showing a process definition file display screen that corresponds to FIG. 9.

FIG. 17 is a diagram showing a screen that is displayed at the time of making a selection using a cursor.

FIG. 18 is a diagram showing a case where "auto (color/black and white)" is selected.

FIG. 20 is a diagram showing a new process definition file.

DESCRIPTION OF THE EMBODIMENTS

Figure 1:
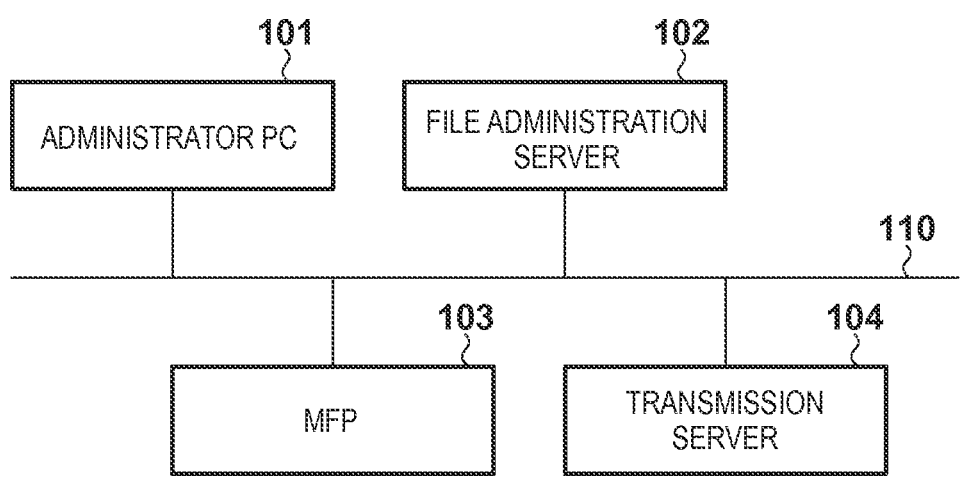
FIG. 1 is a diagram showing an overall configuration of an image processing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. It should be noted that the same reference numerals are given to the same constituent elements, and description thereof is omitted.

First Embodiment

FIG. 1 is a diagram showing an overall configuration of an image processing system according to the present embodiment. An administrator PC 101, a file administration server 102, an MFP 103, and a transmission server 104 are connected to a LAN 110 such that communication therebetween is possible. It should be noted that, although not shown in FIG. 1, an e-mail server, an FTP server or like may be connected to the LAN 110, enabling the transmission server 104 and a user PC 105 to mutually transmit and receive e-mails, and to transmit and receive image data with use of the FTP protocol. It should be noted that the LAN 110 in FIG. 1 may be connected such that communication is possible via other communication structures such as the Internet, various types of wireless communication or the like.

Figure 2:
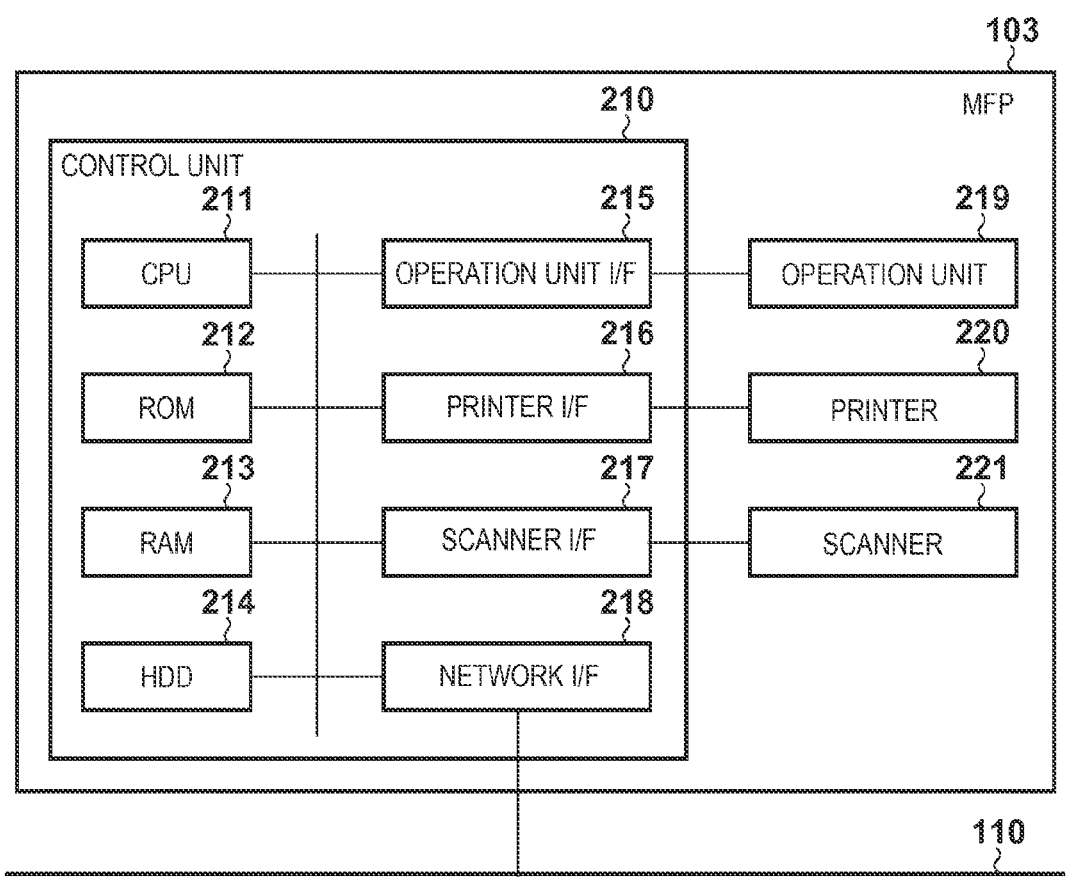
FIG. 2 is a block diagram showing a configuration of an MFP.

FIG. 2 is a block diagram showing a configuration of an MFP 103. A control unit 210 including a CPU 211 controls overall operations of the MFP 103. The CPU 211 reads out control programs stored in a ROM 212, and executes various types of control processing such as reading control and transmission control. A RAM 213 is used as a temporary storage area such as a main memory and a work area for the CPU 211. A HDD 214 stores image data, various types of programs, various types of information tables or the like.

An operation unit I/F 215 connects an operation unit 219 and the control unit 210. The operation unit 219 includes a liquid crystal display unit having a touch panel function, a keyboard and the like. A printer I/F 216 connects a printer 220 and the control unit 210. Image data that is to be printed by the printer 220 is transferred from the control unit 210 to the printer 220 via the printer I/F 216, and is printed on a recording medium by the printer 220. A scanner I/F 217 connects a scanner 221 and the control unit 210. The scanner 221 generates image data by reading an image on an original, and inputs the generated data to the control unit 210 via the scanner I/F 217. A network I/F 218 connects the control unit 210 to the LAN 110. The network I/F 218 transmits the image data to an external apparatus such as the transmission server 104 on the LAN 110, and receives various types of information from the external apparatus (for example, transmission server 104) on the LAN 110.

Figure 3:
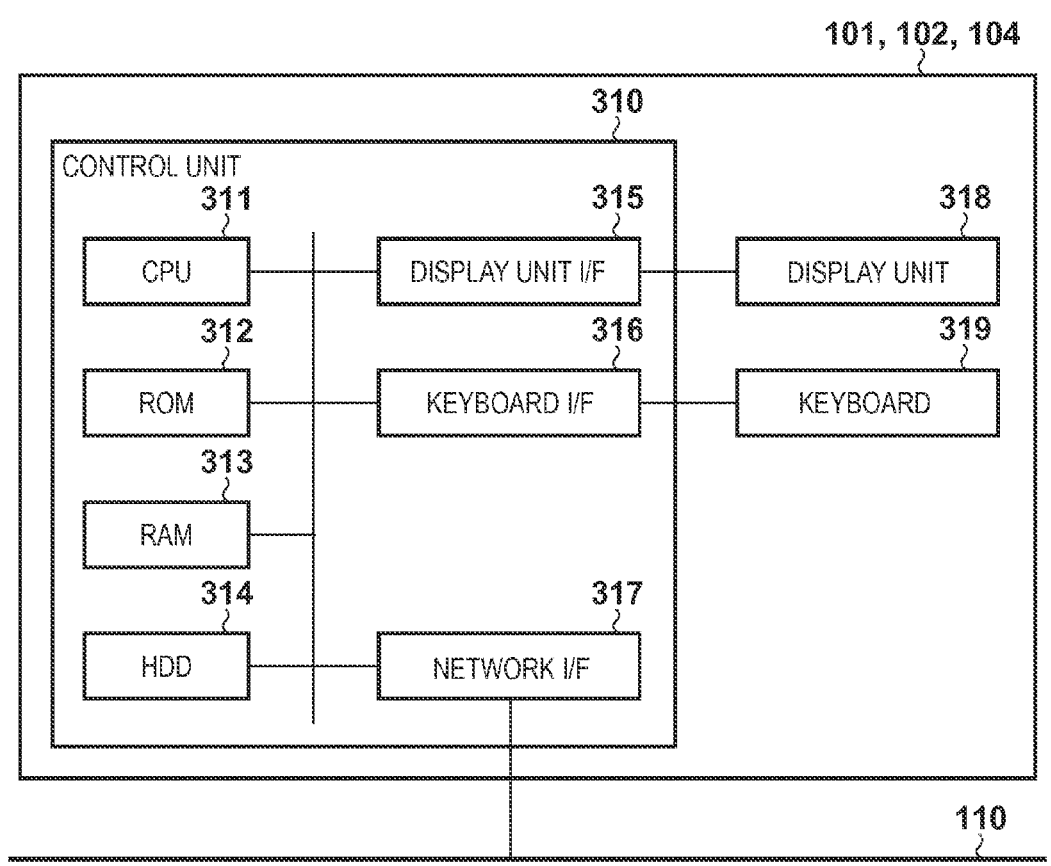
FIG. 3 is a block diagram showing a configuration of an administrator PC.

FIG. 3 is a block diagram showing a configuration of the administrator PC 101. It should be noted that the file administration server 102 and the transmission server 104 have the same configuration as the administrator PC 101.

A control unit 310 including a CPU 311 controls overall operations of the administrator PC 101. The CPU 311 reads out control programs stored in a ROM 312, and executes various types of control processing. A RAM 313 is used as a temporary storage area such as a main memory and a work area for the CPU 311. A HDD 314 stores image data, various types of programs, various types of information tables or the like.

A display unit I/F 315 connects an display unit 318 and the control unit 310. A keyboard I/F 316 connects a keyboard 319 and the control unit 310. The CPU 311 recognizes an instruction from the user via the keyboard 319, and controls display of a screen that is displayed on the display unit 318 in accordance with the recognized instruction. A network I/F 317 connects the control unit 310 to the LAN 110. The network I/F 317 transmits and receives various types of information with another apparatus on the LAN 110.

Figure 4:
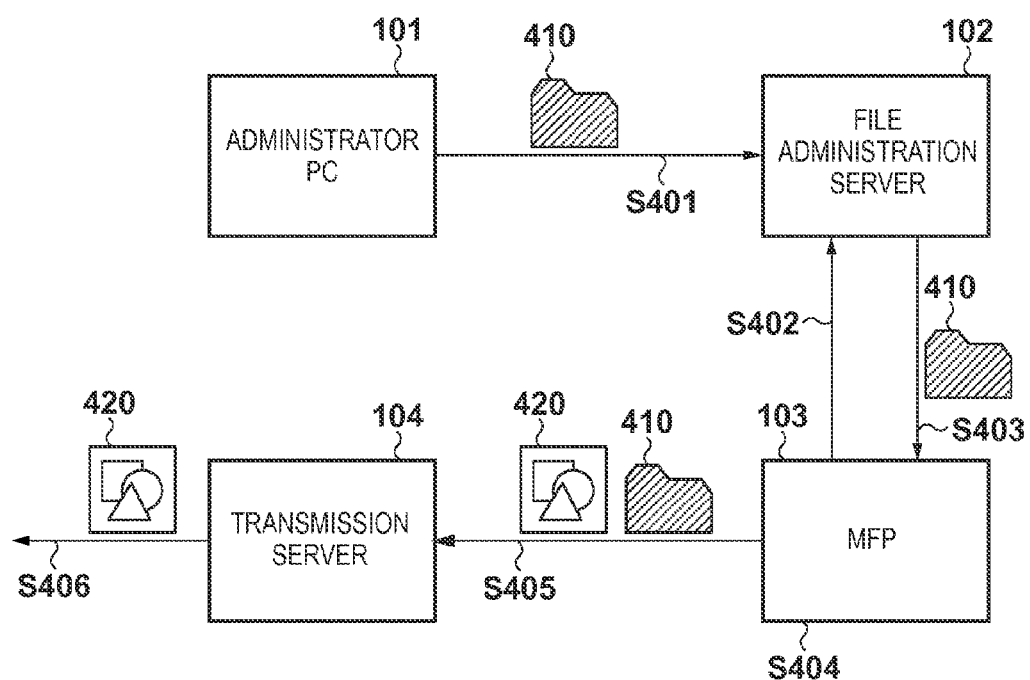
FIG. 4 is a diagram illustrating overall operations of the image processing system according to the first embodiment.

Next, overall operations of the image processing system are described with reference to FIG. 4. Firstly, an administrator operates the administrator PC 101, and creates a process definition file 410 as a setting file in which setting content of image processing is defined. Definitions for executing a series of processes with use of multiple functions included in the MFP 103, the transmission server 104, and the like are described in the process definition file 410. It should be noted that it is assumed that in the present embodiment, for example, a series of processes for causing the MFP 103 to generate image data by reading an image on an original, and transmit the generated image data to a predetermined destination from the transmission server 104 are defined in the process definition file 410.

The administrator sets and inputs various types of processing content (reading parameters, transmission destination, etc.) via a process definition file creation screen that is displayed on the administrator PC 101. After the creation of the process definition file 410 has been completed, the created process definition file 410 is transmitted via the LAN 110 to the file administration server 102 (step S401).

Upon receiving the process definition file 410, the file administration server 102 registers and holds the received process definition file 410 in association with user information (hereinafter, for example, refers to user ID). Then, in the case where a user has logged in to the MFP 103, the MFP 103 transmits the user ID corresponding to the logged-in user to the file administration server 102, and requests process definition files 410 corresponding to the logged-in user (step S402). Upon receiving a request for process definition files 410, the file administration server 102 reads out process definition files 410 that correspond to the received user ID, and transmits the read process definition files 410 to the MFP 103 via the LAN 110 (step S403).

Upon acquiring one or more process definition files 410 from the file administration server 102, the MFP 103 displays a list of the acquired process definition files to the user, and receives a selection of a process definition file from the user. Moreover, the MFP 103 causes the scanner 221 to execute reading processing based on the definitions described in the process definition file selected by the user, and generates image data in accordance with the definitions described in the selected process definition file 410 (step S404).

Then, the MFP 103 transmits generated image data 420 and the process definition file 410 to the transmission server 104, and requests the transmission server 104 to transmit the image data to a destination (step S405). The transmission server 104 transmits the image data 420 to the destination with use of an e-mail, the FTP protocol or the like in accordance with the definitions described in the received process definition file 410 (step S406).

The configuration described above eliminates the need for the user to perform troublesome operations such as designating the reading parameters, transmission destination and the like in image processing. In the present embodiment, at the time of process definition files being created by the administrator PC 101, permission is given such that designated definitions can be modified by the MFP 103. Doing so can prevent to the utmost processing that is not intended by the administrator from being executed by the user of the MFP 103, while enabling usability to be improved by giving the user the freedom to partially select definitions.

FIG. 5 is a diagram showing content of the process definition file 410 created by the administrator PC 101. The process definition file 410 is configured to include a user ID 501, a process definition filename 502, and a definition item 503. The user ID 501 indicates a user ID used when a user who uses the process definition file 410 logs in to the MFP 103. The process definition filename 502 concisely indicates the use purpose of the process definition file 410. The process definition filename 502 is desirably a name that enables a user who uses the process definition file 410 in the MFP 103 to clearly understand the purpose by looking at the process definition filename 502. The definition item 503 describes the detailed content of the process definition file 410. "Definition item 1" to "definition item 5" expressed by the definition item 503 respectively include a default setting value 504, a selection permission item 505, and an option item 506.

The default setting value 504 is a default setting value whose use is prompted when the user corresponding to the user ID 501 uses the process definition file 410. Also, the selection permission item 505 is an item that configures whether to permit or prohibit use of setting values other than the default setting value 504 with respect to the user corresponding to the user ID 501. If the selection permission item 505 is "permit", the user who uses the process definition file 410 can set options described in the option item 506, namely, multiple setting value candidates that can be set. On the other hand, in the case where the selection permission item 505 is "prohibit", the user who uses the process definition file 410 can only use the MFP 103 with values set in the default setting value 504.

Figure 6:
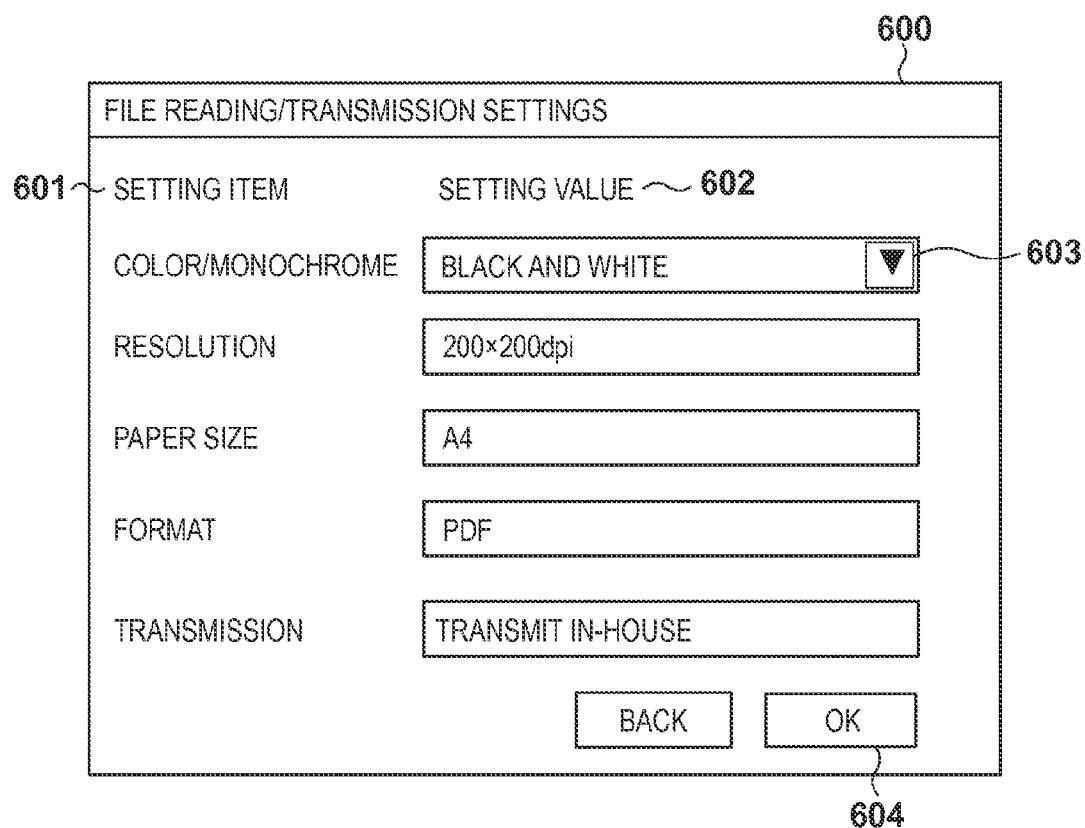
FIG. 6 is a diagram showing a process definition file display screen that is displayed on an operation unit.

FIG. 6 is a diagram showing an example of a process definition file display screen 600 that is displayed on the operation unit 219 at the time of usage of the process definition file 410 in the MFP 103. The definition item 503 of the process definition file 410 is reflected in a setting item 601, and either the default setting value 504 or the option item 506 of the process definition file 410 is reflected in a setting value 602. While a determination method regarding default display of the setting value 602 is described later, in FIG. 6 it is assumed that the setting value that is designated in the default setting value 504 of the process definition file 410 is displayed. Also, the selection permission item 505 in the "definition item 1" 503 of the process definition file 410 is "permit". Thus, a user can select the option item 506 in the "definition item 1" 503 of the process definition file 410 by making a selection using a cursor 603.

FIG. 7 is a diagram showing a screen that is displayed at the time of making a selection using the cursor 603 on the process definition file display screen 600 shown in FIG. 6. Selectable setting values 701, shown in FIG. 7, are setting values that are designated by the option item 506 in the definition item 503 of the process definition file 410. The user can change the setting value of the "color/monochrome" item of the setting item 601 by selecting a desired setting value 701.

FIG. 8 is a diagram showing a process definition file execution history 800 that is stored in the HDD 214 of the MFP 103 and updated as appropriate. The process definition file execution history 800 is used for determining a value that is to be displayed as the default value for the setting value 602, when the process definition file 410 is displayed on the operation unit 219 of the MFP 103.

A user ID 801 corresponds to a login ID of a user who logs in to the MFP 103. A process definition filename 802 corresponds to the process definition filename 502 of the process definition file 410. A definition item number 803 indicates the number of items in the definition item 503 of the process definition file 410. A definition item execution history 804 indicates definition item names that correspond to the definition item 503 of the process definition file 410, and setting value execution histories of the definition item 503. Every time the process definition file 410 is executed in the MFP 103, the execution frequency of the setting value selected in the definition item 503 is updated.

For example, it is assumed that the process definition file 410 is executed with the setting value 602 of the setting item 601 on the process definition file display screen 600. In this case, "1" is added to a "black and white" of a "definition item 1 execution frequency" 805. "1" is also added to the execution frequencies of definition items in other setting items 601 in the same manner. Moreover, in FIG. 8, the execution frequencies of the definition items are all "0". This represents that a user corresponding to the user ID 801 has not yet executed the process definition file 410 for "in-house publication transmission" that is indicated in the process definition filename 802.

Next, a method is described for determining a value that is to be displayed in the setting value 602 as a default value, when the process definition file 410 is displayed on the operation unit 219 of the MFP 103.

FIG. 9 is a diagram showing a process definition file execution history 900 after a user corresponding to the user ID 801 has executed the process definition file 410 for the "in-house publication transmission" indicated in the process definition file name 802 eighteen times. As shown in FIG. 5, the selection permission item 505 of the process definition file 410 is set to "permit". In the present embodiment, the user executes "auto (color/black and white)" 901 of the "definition item 1 execution frequency" 805 sixteen times, and executes "black and white" 902 two times. Moreover, in other items of the definition item execution history 804, the selection permission item 505 of the process definition file 410 is set to "prohibit". In other words, in the present embodiments, the user executes each default setting value eighteen times.

The MFP 103 first checks all selection permission items 505 of the definition item 503 in the case of obtaining the process definition file 410. Here, in the case where the selection permission item 505 is set to "permit", the MFP 103 determines the "auto (color/black and white)" 901 whose execution frequency is the largest in the "definition item 1 execution frequency" 805 of the process definition file execution history 900 as the default display. On the other hand, in the case where the selection permission item 505 is set to "prohibit", a value set in the default setting value of the process definition file 410 is determined as the default display.

FIG. 10 is a diagram showing a process definition file default display screen 1000 in the case where the MFP 103 holds the process definition file execution history 900, when the process definition file 410 is acquired. While "black and white" is set as the default setting value 504 of the process definition file 410 shown in FIG. 5, "auto (color/black and white)" 901 whose execution frequency is the largest is displayed as the default in FIG. 10.

Figure 11:
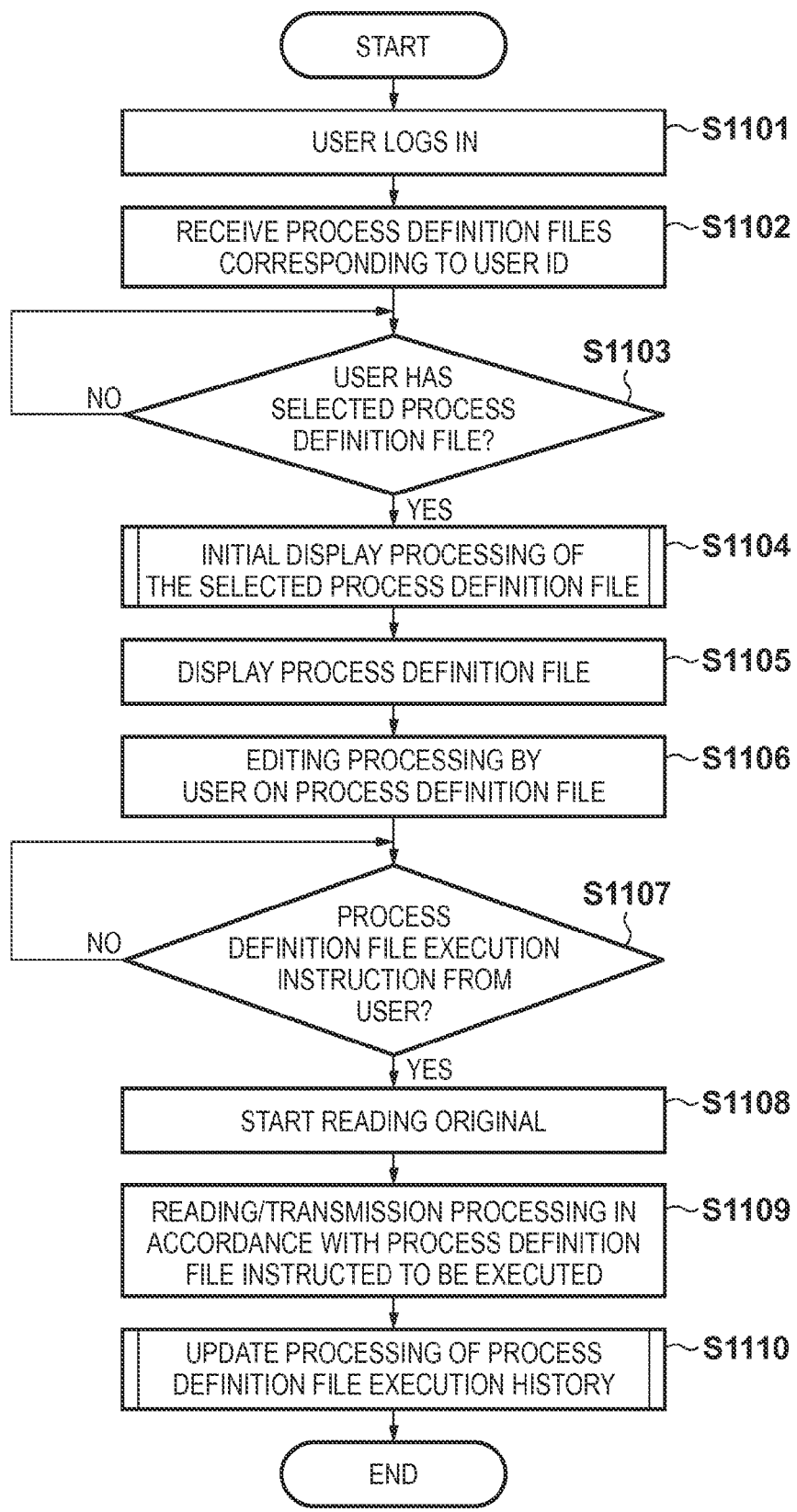
FIG. 11 is a flowchart showing a processing procedure of an image processing setting method.

FIG. 11 is a flowchart showing a processing procedure of an image processing setting method in the present embodiment. The processing shown in FIG. 11 is, for example, executed by the CPU 211 of the MFP 103. Firstly, when a user logs in to the MFP 103 in step S1101, the CPU 211 receives a user ID input from the user via the operation unit 219 of the MFP 103. Next, the CPU 211 requests and receives the process definition file 410 corresponding to the input user ID from the file administration server 102 in step S1102. At this time, in the case where there are multiple process definition files, the CPU 211 receives all of those files. In step S1103, the CPU 211 displays a list of the multiple received process definition files 410 on the operation unit 219, and allows the user to select one of the received files. In the case where there is only one process definition file, selection by the user is omitted and that process definition file is selected.

In step 1104, the CPU 211 determines setting content displayed as initial display (default display) when displaying the process definition file 410 that has been selected by the user in step S1103 on the operation unit 219. Details of the processing in step S1104 will be describe later. In step S1105, the CPU 211 displays initial display content of the process definition file 410 that was determined in step S1104. Here, the user can change only setting items to which selection permission has been given in the process definition file 410 displayed in step S1105. In step S1106, the CPU 211 receives a change input from the user.

In step S1107, the CPU 211 receives a process definition file execution instruction from the user via the operation unit 219. In step S1108, the CPU 211 causes the scanner 211 of the MFP 103 to start reading an original that is placed on a platen. In step S1109, the CPU 211 reads image data of the original in accordance with a process definition file, performs image processing for the image data, and transmits the processed image data along with the process definition file to the transmission server 104. In step S1110, the CPU 211 updates the execution history of each setting item in the executed process definition file. Details of the processing in step S1110 will be described later.

Figure 12:
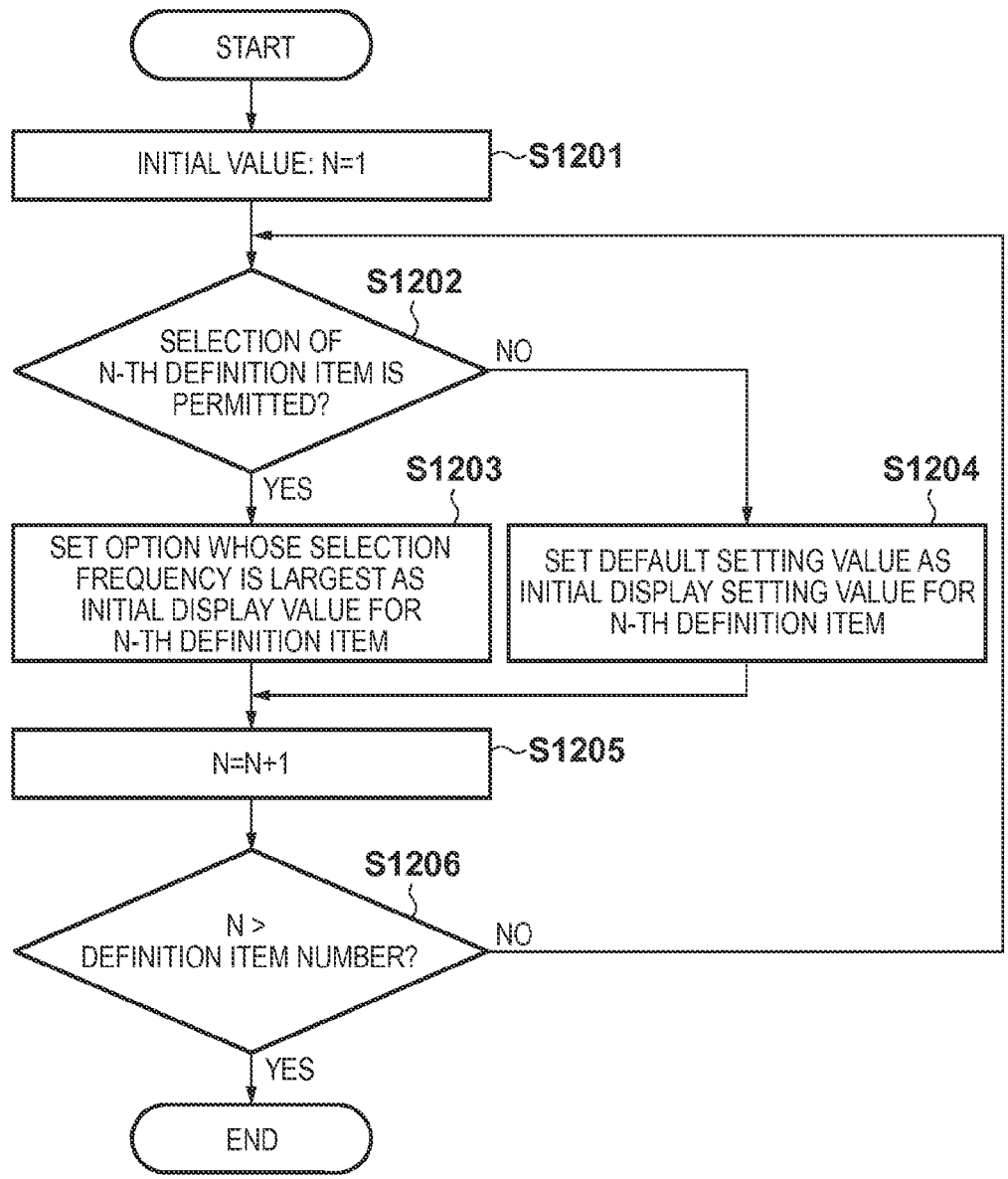
FIG. 12 is a flowchart showing a processing procedure of step S1104.

Next, details of the processing in step S1104 are described. FIG. 12 is a flowchart showing a processing procedure of step S1104. Firstly, in step S1201, the CPU 211 sets a parameter N and stores an initial value 1 in the parameter N. In step S1202, the CPU 211 determines whether or not selection permission has been given regarding the selection permission item 505 of the N-th definition item of the process definition file. Here, in the case where it is determined that "permit" is set, the CPU 211 specifies the option item whose selection frequency is the largest regarding the N-th definition item as a setting value that is to be initially displayed in step S1203. On the other hand, in the case where it is determined that "prohibit" is set, in step S1204, the CPU 211 specifies a setting value that has been determined in advance as the default setting value regarding the N-th definition item as the setting value that is to be initially displayed.

In step S1205, the CPU 211 adds 1 to a parameter N. In step S1206, the CPU 211 returns to the processing of step S1202 if the parameter N is less than or equal to the number of definition items. On the other hand, the CPU 211 stops the processing if the parameter N is greater than the number of the definition items.

Figure 13:
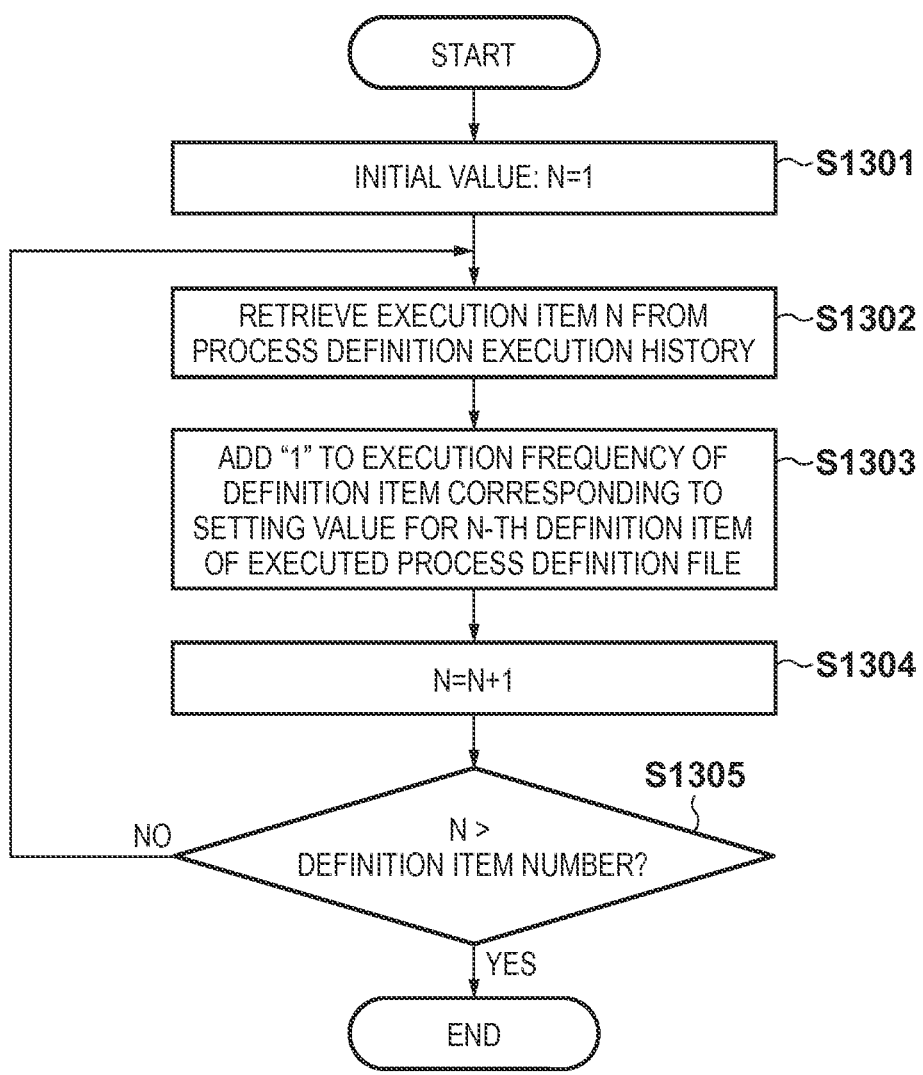
FIG. 13 is a flowchart showing a processing procedure of step S1110.

Next, details of processing in step S1110 are described. FIG. 13 is a flowchart showing a processing procedure of step S1110. Firstly, in step S1301, the CPU 211 sets the parameter N and stores the initial value 1 in the parameter N. In step S1302, the CPU 211 retrieves an N-th definition item from the process definition file execution history. Regarding the executed process definition file, in step S1303, 1 is added to the execution frequency that corresponds to the setting value of the N-th definition item in the process definition file execution history. In step S1304, the CPU 211 adds 1 to the parameter N. In step S1305, the CPU 211 returns to the processing of step S1302 if the parameter N is less than or equal to the number of the definition item. On the other hand, the CPU 211 stops the processing if the parameter N is greater than the number of the definition item.

In the present embodiment, although the default setting value 504 of the process definition file 410 and types of option items 506 are fixed in the description, a configuration may be adopted in which they can be increased or decreased with the administrator PC 101 as appropriate. Also, in this case, the timing when the process definition file execution history 800 is updated is not limited to the timing when image processing is executed. For example, updating may be performed at the timing when an execution instruction for the process definition file 410 is received.

Second Embodiment

Figure 14:
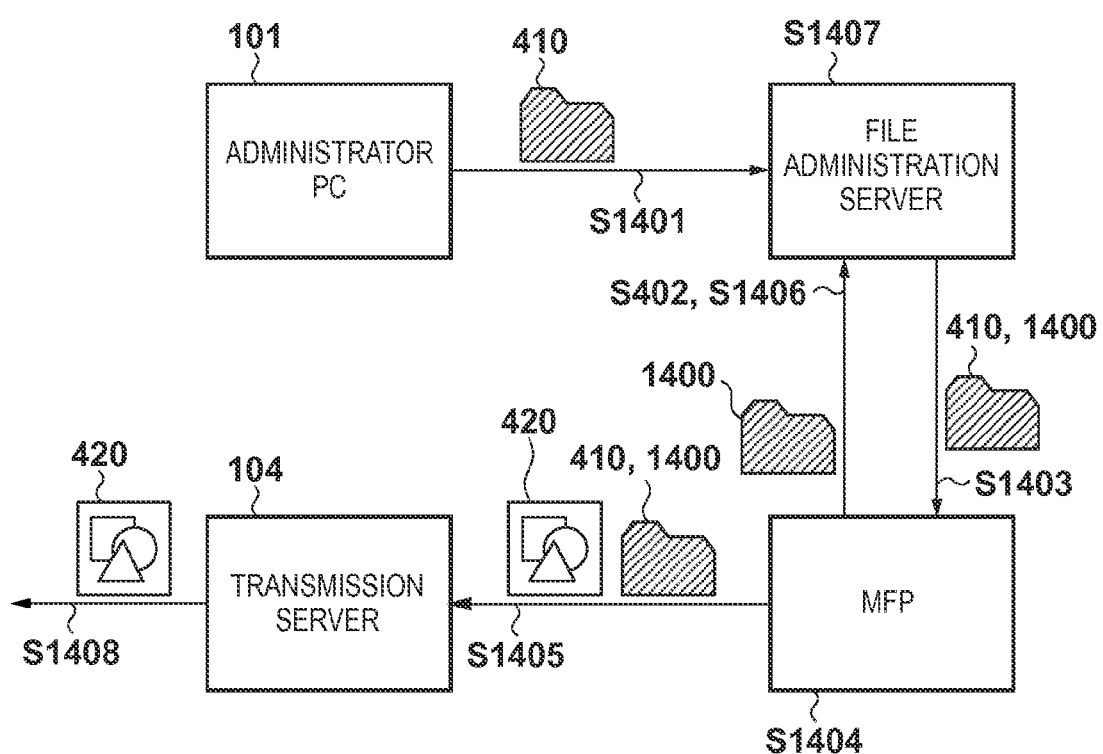
FIG. 14 is a diagram illustrating overall operations of an image processing system according to the second embodiment.

Next, the second embodiment is described. FIG. 14 is a diagram illustrating overall operations of an image processing system according to the present embodiment. In FIG. 14, an administrator operates the administrator PC 101 to create a process definition file 410. Definitions for executing a series of processes with use of multiple functions included in the MFP 103, the transmission server 104, and the like are described in the process definition file 410. It should be noted that in the present embodiment, similarly to the first embodiment, a series of processes for causing the MFP 103 to generate image data by reading an image on an original, and transmit the generated image data to a predetermined destination from the transmission server 104 are defined in the process definition file 410.

The administrator can input various types of processing content (reading parameters, transmission destination, etc.) via a process definition file creation screen displayed on the administrator PC 101. After the creation of the process definition file 410 has been completed, the created process definition file 410 is transmitted via the LAN 110 to the file administration server 102 (step S1401).

Upon receiving the process definition file 410, the file administration server 102 registers and holds the received process definition file 410 in association with user ID. Then, in the case where a user has logged in to the MFP 103, the MFP 103 transmits the user ID corresponding to the logged-in user to the file administration server 102, and requests process definition files 410 corresponding to the logged-in user (step S1402). Upon receiving a request for process definition files 410, the file administration server 102 reads out process definition files 410 that correspond to the received user ID, and transmits the process definition files 410 to the MFP 103 via the LAN 110 (step S1403).

Upon acquiring one or more process definition files 410 from the file administration server 102, the MFP 103 displays a list of the acquired process definition files to the user, and receives a selection of a process definition file from the user. Moreover, the MFP 103 causes the scanner 221 to execute reading processing based on the definitions described in the process definition file selected by the user, and generates image data in accordance with the definitions described in the selected process definition file 410 (step S1404). Then, the MFP 103 transmits generated image data 420 and the process definition file 410 to the transmission server 104, and requests the transmission server 104 to transmit the image data (step S1405).

In the present embodiment, in the case where a user changes a setting value of the process definition file 410 in step S1404, the MFP 103 transmits the changed value as a new process definition file 1400 to the file administration server 102 (step S1406). Transmission processing of the new process definition file that has been changed is described later.

The file administration server 102 registers and holds the received process definition file 1400 received in step S1406 as a new process definition file in association with the user ID (step S1407). The transmission server 104 transmits the image data 420 with use of an e-mail, the FTP protocol or the like in accordance with the definitions described in the received process definition file 410 (step S1408).

Figure 15:
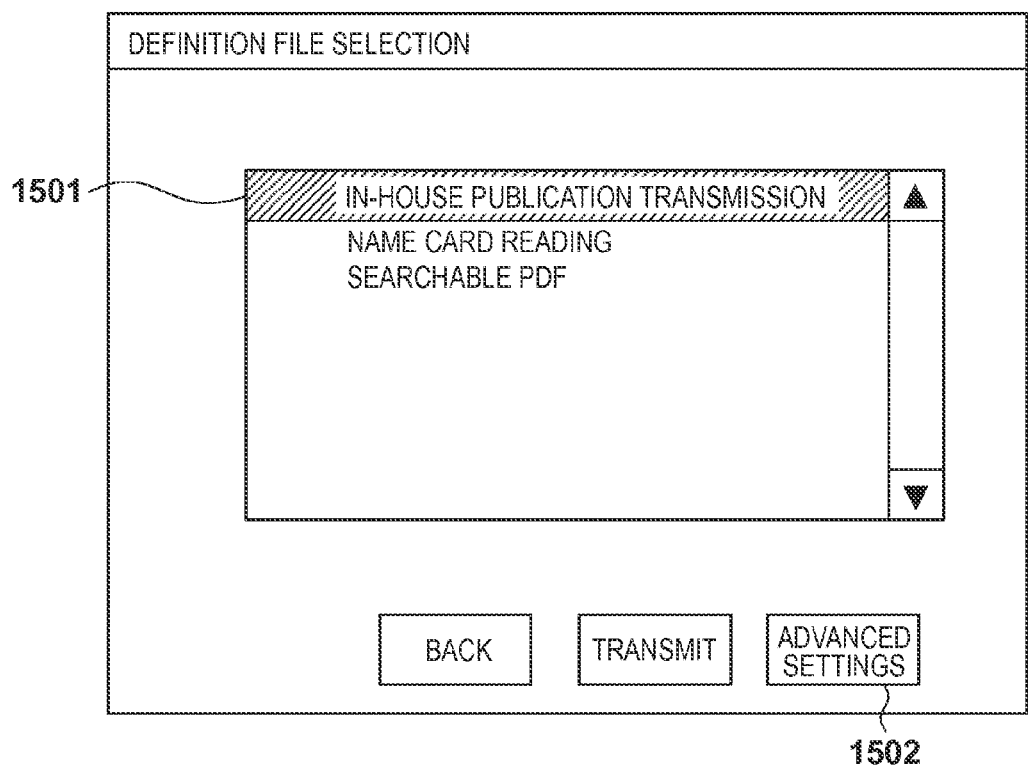
FIG. 15 is a diagram showing a screen for selecting a process definition filename.

FIG. 15 is a diagram showing an example of a screen for selecting a filename of a process definition file 410 that is displayed on a liquid crystal display unit included in the operation unit 219, when executing image processing in the MFP 103 based on a process definition file 410. Process definition files 410 that have been transmitted from the file administration server 102 are displayed as a list in a selection display area 1501, and then when the user makes a selection on the screen, the selected process definition file 410 is highlighted. After a process definition file 410 is selected in the selection display area 1501, an advanced settings screen shown in FIG. 16 is displayed when the user presses an advanced settings button 1502.

Figure 16:
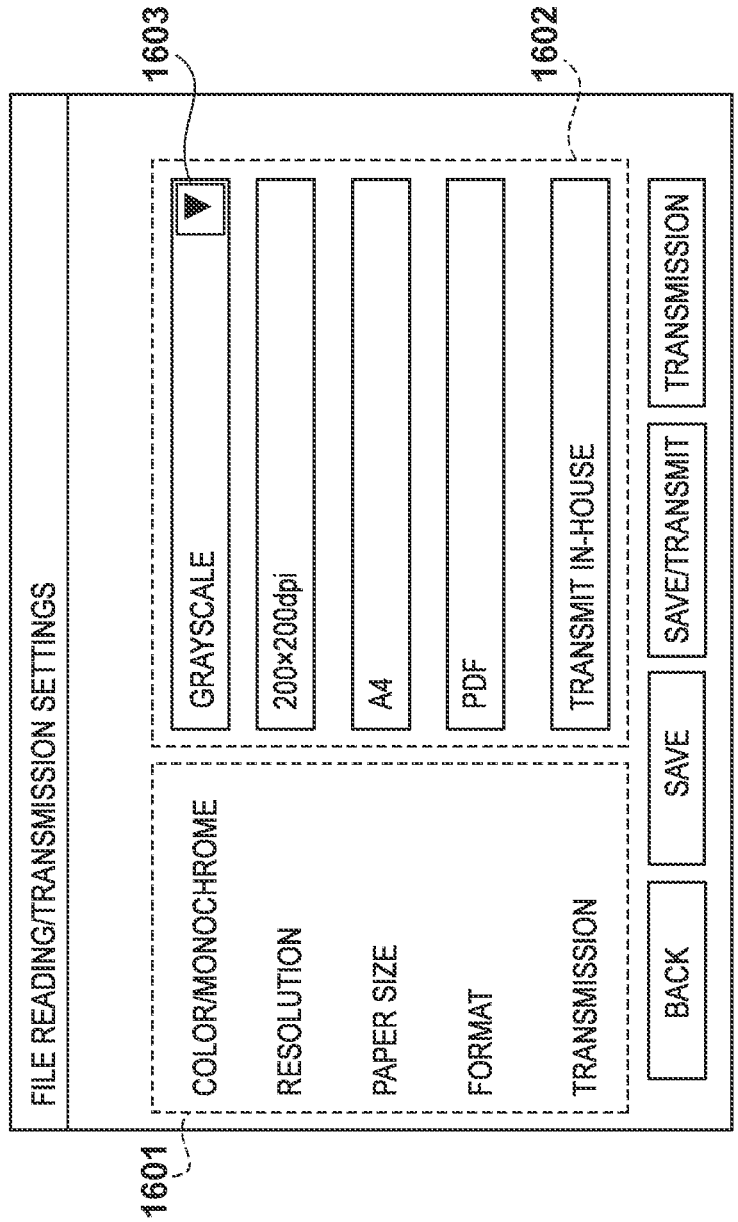
FIG. 16 is a diagram showing an advanced settings screen for the selected process definition file.

As shown in FIG. 16, the definition item 503 for the process definition file 410 is reflected in a setting item 1601, and the default setting value 504 of the process definition file 410 is reflected in a setting value 1602. Here, in the case where the selection permission item 505 is "permit" in the definition item 503 of the process definition file 410, as described in the first embodiment, a setting value whose selection history frequency by the user is the largest among selection items 506 is displayed in a setting value 1602. Moreover, the user can select a setting value from the option item 506 in the definition item 503 with use of a cursor 1603. In the description of the present embodiment, as shown in FIG. 16, it is assumed that "grayscale" has the largest history frequency.

FIG. 17 is a diagram showing an example of a screen that is displayed at the time of making a selection using a cursor 1603 shown in FIG. 16. Selectable setting values 1701, are setting values that are designated by the option item 506 in the "definition item 1" 503 of the process definition file 410. The user can change the setting value 1602 of the "color/monochrome" item of the setting item 1601 by selecting a desired setting value 1701.

FIG. 18 shows a screen in the case where a user selects "auto (color/black and white)" in a setting value 1602 for the "color/monochrome" item of the setting item 1601 on the screen shown in FIG. 17. In the present invention, a save button 1801 for saving only a process definition file whose setting values have been changed as a new file, a save/transmission button 1802 for starting reading with setting values that have been saved as the new file and further changed, and a transmission button 1803 for performing a reading operation with the changed setting values. In the case where the transmission button 1803 is pressed, the process setting file whose setting values have been changed is not saved as a new file.

Figure 19:
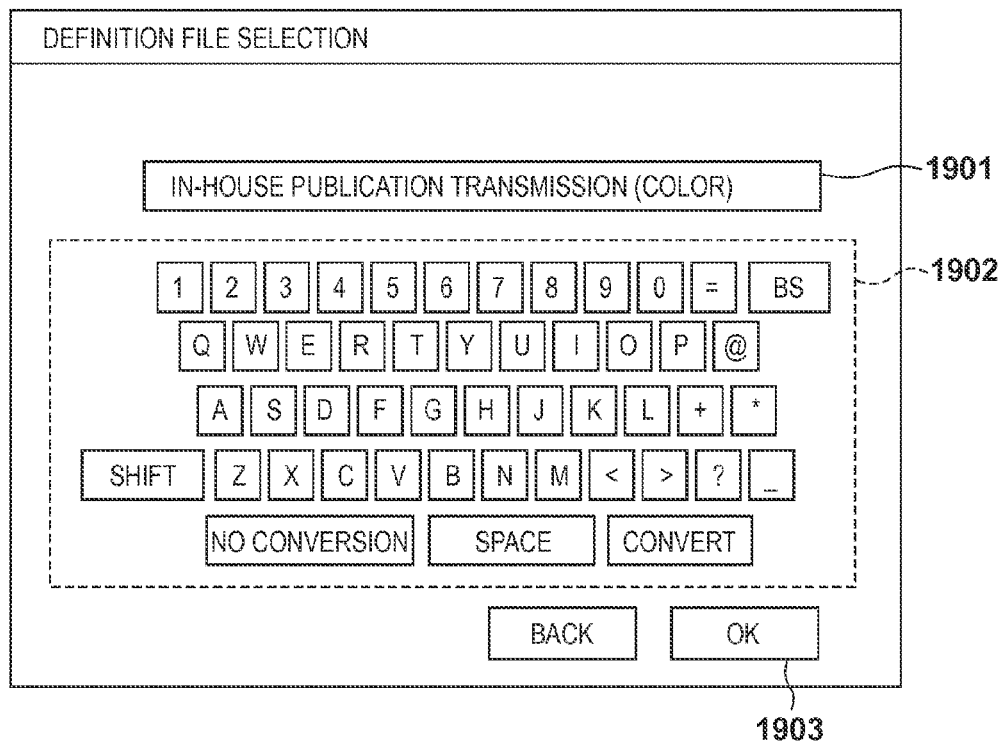
FIG. 19 is a diagram showing a screen that is displayed in the case where a save button is pressed.

Hereinafter, an operation is described in the case where the save button 1801 is pressed. FIG. 19 is a diagram showing an example of a screen that is displayed in the case where the save button 1801 is pressed. A new process definition filename that has been input in a key input area 1902 is displayed in a field 1901. If an OK button 1903 is pressed by the user, the new process definition file 1400 is transmitted to a file administration server 102.

FIG. 20 is a diagram showing an example of a new process definition file 1400 that has been transmitted to the file administration server 102. It is assumed that a process definition filename 2001 of the new process definition file 1400 is "in-house publication transmission (color)". Moreover, a default setting value 2002 of the "definition item 1" is changed to "auto (color/black and white)" that was set in FIG. 18, and a selection permission item is changed to "prohibit".

Figure 21:
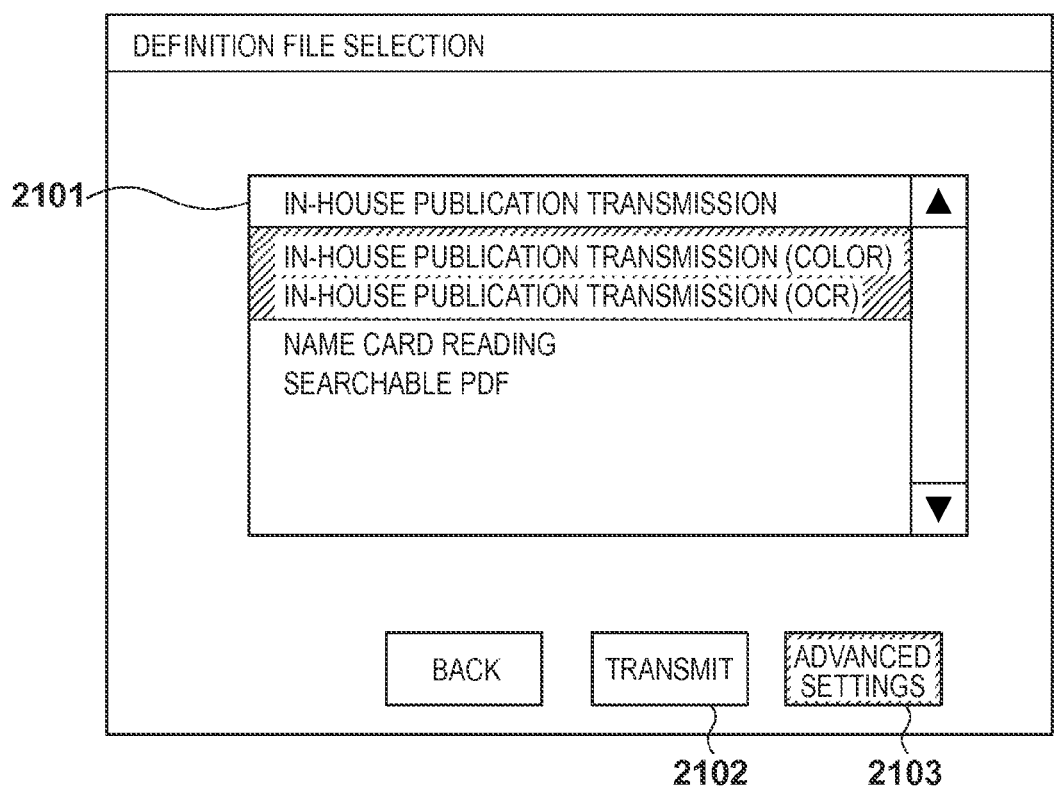
FIG. 21 is a diagram showing a list that includes the new process definition file.

FIG. 21 is a diagram showing a screen that displays a list including the new process definition file 1400 from the file administration server 102 for a user who again has logged in to the MFP 103. A process definition file display field 2101 indicates a state in which multiple process definition files are selected by the user, and in which the user can press a transmission button 2102. Moreover, since it is assumed that selection permission for all items of the new process definition file 1400 "in-house publication transmission (color)" is "prohibit", an advanced settings button 2103 is grayed out so that the advanced settings button cannot be pressed. If the transmission button 2102 is pressed by the user, the MFP 103 transmits generated image data 420 and the new process definition file 1400 to the transmission server 104, and requests the transmission server 104 to transmit the image data to a destination. The transmission server 104 transmits the image data 420 with use of an e-mail, the FTP protocol or the like in accordance with definitions described in the received process definition file 410 (step S1408).

An operation is described in the case where the save/transmission button 1802 and the transmission button 1803 are pressed, again with reference to FIG. 18. In the case where the save/transmission button 1802 is pressed, the new process definition file 1400 is transmitted to the file administration server 102 in a similar manner to the case of the save button 1801. Also, as described above, the MFP 103 transmits generated image data 420 and the new process definition file 1400 to the transmission sever 104. In the case where the transmission button 1803 is pressed, the new process definition file 1400 is transmitted to the transmission server 104, and is not transmitted to the file administration server 102.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-184064, filed Aug. 25, 2011, which is hereby incorporated by reference herein in its entirety.

What is claimed is:

1. An image processing apparatus that executes processing in accordance with a process definition file in which a plurality of processes that are to be executed are defined, the image processing apparatus comprising:
    a receiving unit for receiving the process definition file, the process definition file including at least one definition item corresponding to the plurality of processes to be executed, and the at least one definition item comprising (a) a default setting for the definition item, (b) a first option setting and (c) a second option setting that is different from the first option setting, wherein a value of the first option setting is initially set as a value of the default setting for the definition item;
    a counting unit configured to count, for each of the first option setting and the second option setting in the process definition file, a number of times of execution;
    a first determining unit configured to determine whether changing the value of the default setting for the definition item is permitted or prohibited;
    a second determining unit configured to determine, based on the number of times of execution counted by the counting unit for the first option setting and the second option setting, whether to change the value of the default setting for the definition item from the value of the first option setting to a value of the second option setting;
    a changing unit configured to (a) if (1) it is determined by the first determining unit that changing the value of the default setting for the definition item is permitted and (2) it is determined by the second determining unit that the value of the default setting should be changed, change the value of the default setting for the definition item from the value of the first option setting to the value of the second option setting, and (b) if it is determined by the first determining unit that changing the value of the default setting for the definition item is prohibited, not change the value of the default setting for the definition item; and
    a display control unit configured to display on a setting screen the value of the default setting for the definition item.

2. The image processing apparatus according to claim 1, wherein the changing unit changes the value of the default setting for the definition item from the value of the first option setting to the value of the second option setting when the number of times of execution of the second option setting is greater than the number of times of execution of the first option setting.

3. The image processing apparatus according to claim 2, further comprising a table in which the first and second option settings and the number of times of execution are associated with each other,
    wherein the changing unit changes the value of the default setting for the definition item from the value of the first option setting to the value of the second option setting when the number of times of execution of the second option setting is greater than the number of times of execution of the first option setting, with reference to the table.

4. The image processing apparatus according to claim 3, further comprising:
    an execution unit configured to receive an instruction for executing the processing in accordance with the process definition file based on an option setting that is selected from a plurality of option settings for the process by a user on the setting screen, and executing the processing in accordance with the process definition file according to the instruction; and
    an update unit configured to update, in the table, the number of times of execution for the option setting selected by the user.

5. The image processing apparatus according to claim 1, further comprising:
    a storage unit configured to store the process definition file in which the at least one definition item is described, in association with user information.

6. An image processing setting method that is executed in an image processing apparatus that executes processing in accordance with a process definition file in which a plurality of processes that are to be executed are defined, the image processing setting method comprising:
    a receiving step of receiving the process definition file, the process definition file including at least one definition item corresponding to the plurality of processes to be executed, and the at least one definition item comprising (a) a default setting for the definition item (b) a first option setting and (c) a second option setting that is different from the first option setting, wherein a value of the first option setting is set as a value of the default setting for the definition item;
    a counting step of counting, for each of the first option setting and the second option setting in the process definition file, a number of times of execution;
    a first determining step of determining, based on the number of times of execution counted in the counting step for the first option setting and the second option setting, whether to change the value of the default setting for the definition item from the value of the first option setting to a value of the second option setting;
    a changing step of, (a) if (1) it is determined that changing the value of the default setting for the definition item is permitted and (2) it is determined that the value of the default setting should be changed, changing the value of the default setting for the definition item from the value of the first option setting to the value of the second option setting, and (b) if it is determined that changing the value of the default setting for the definition item is prohibited, not changing the value of the default setting for the definition item; and a display control step of displaying on a setting screen the value of the default setting for the definition item.

7. A non-transitory computer-readable storage medium configured to store a program that causes a computer to execute:

a receiving step of receiving a process definition file including at least one definition item, the at least one definition item comprising (a) a default setting for the definition item (b) a first option setting and (c) a second option setting that is different from the first option setting, wherein a value of the first option setting is set as a value of the default setting for the definition item;

a counting step of counting, the first option setting and the second option setting in the process definition file, a number of times of execution;

a first determining step of determining, based on the number of times of execution counted in the counting step for the first option setting and the second option setting, whether to change the value of the default setting for the definition item from the value of the first option setting to a value of the second option setting;

a changing step of (a) if (1) it is determined that changing the value of the default setting for the definition item is permitted and (2) it is determined that the value of the default setting should be changed, changing the value of the default setting for the definition item from the value of the first option setting to the value of the second option setting, and (b) if it is determined that changing the value of the default setting for the definition item is prohibited, not changing the value of the default setting for the definition item; and a display control step of displaying on a setting screen the value of the default setting for the definition item.

8. The image processing apparatus according to claim 5, wherein the display control unit displays on the setting screen the value of the second option setting based on the process definition file stored by the storage unit, if the changing unit changes the value of the default setting for the definition item from the value of the first option setting to the value of the second option setting.

9. The image processing apparatus according to claim 5, wherein in a case where the value of the default setting for the definition item is changed by the changing unit from the value of the first option setting to the value of the second option setting, the storage unit stores a new process definition file in which the value of the second option setting is described, and wherein the display control unit displays on the setting screen the value of the default setting based on the process definition file or the new process definition file.

10. The image processing apparatus according to claim 9, wherein the image processing apparatus further comprises:

a generating unit configured to generate data in accordance with the processing; and a transmitting unit configured to transmit to a server the data generated by the generating unit and one of (i) the process definition file and (ii) the new process definition file, wherein the server sends the data generated by the image processing apparatus to another apparatus in accordance with the processing.

11. The image processing apparatus according to claim 1, wherein the definition item corresponds to one of color, resolution, paper size, format, and transmission settings.

12. The image processing apparatus according to claim 11, wherein (a) if the definition item corresponds to color, the first option setting corresponds to one of black and white and grayscale, (b) if the definition item corresponds to resolution, the first option setting corresponds to one of 100×100, 150×150, 200×200, 300×300, 400×400, and 600×600, (c) if the definition item corresponds to paper size, the first option setting corresponds to one of A4, A3, A4R, and B5, (d) if the definition item corresponds to format, the first option setting corresponds to one of TIFF, JPEG, PDF, PDF+OCR, and High Compression PDF, and (e) if the definition item corresponds to transmission settings, the first option setting corresponds to one of transmit to self, transmit in-house, transmit to outside, save in HDD, and transmit to SMB server.

13. The image processing apparatus according to claim 1, wherein the receiving unit receives the process definition file from a server, and the process definition file defines whether changing the value of the default setting for the definition item is permitted or prohibited, and the first determining unit determines whether changing the value of the default setting for the definition item is permitted or prohibited in accordance with the definition of the process definition file.

* * * * *